(12) United States Patent
Smith et al.

(10) Patent No.: US 7,434,767 B2
(45) Date of Patent: Oct. 14, 2008

(54) SPACECRAFT ADAPTER HAVING EMBEDDED RESOURCES, AND METHODS OF FORMING SAME

(75) Inventors: Robert A Smith, Hampton Cove, AL (US); Kim S Wright, Huntsville, AL (US); Gregory P Bowman, Madison, AL (US); Leigh A Hanback, Meridianville, AL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/068,343

(22) Filed: Feb. 28, 2005

(65) Prior Publication Data

US 2006/0192057 A1      Aug. 31, 2006

(51) Int. Cl.
*B64G 1/10* (2006.01)
(52) U.S. Cl. .................................................. 244/173.1
(58) Field of Classification Search .............. 244/173.3, 244/173.1
See application file for complete search history.

(56) References Cited

U.S. PATENT DOCUMENTS

| 5,152,482 | A | 10/1992 | Perkins et al. |
| 5,271,582 | A | 12/1993 | Perkins et al. |
| 6,330,093 | B1 | 12/2001 | Eller et al. |
| 6,357,698 | B1 | 3/2002 | DiVerde et al. |
| 2004/0124312 | A1 | 7/2004 | Mueller |
| 2005/0045771 | A1 | 3/2005 | Caldwell |

FOREIGN PATENT DOCUMENTS

JP        06-072394        3/1994

*Primary Examiner*—Timothy D Collins
(74) *Attorney, Agent, or Firm*—Harness, Dickey & Pierce, P.L.C.

(57)         ABSTRACT

A spacecraft adapter having embedded resources for supporting a non-primary payload on a launch vehicle. The spacecraft adapter includes a battery, a power distribution and control system, and an interface circuit for interfacing with the non-primary payload. Other modules/subsystems such as data storage, sensor and data interface and communications may be included to suit the needs of a particular non-primary payload and/or particular mission of the non-primary payload. The adaptor does not require any interfacing with the bus of the primary payload and can be scaled/modified as needed to provide only that degree of functionality needed for a given non-primary payload being carried by the launch vehicle.

16 Claims, 2 Drawing Sheets

SPACECRAFT ADAPTER HAVING EMBEDDED RESOURCES, AND METHODS OF FORMING SAME

FIELD OF THE INVENTION

The present invention relates to spacecraft, and more particularly to an adapter for use on a launch vehicle, in which the adapter includes embedded, dedicated modular subsystems for supporting a non-primary payload being carried by the launch vehicle.

BACKGROUND OF THE INVENTION

Current spacecraft technology provides all the resources for a spacecraft in the portion of the spacecraft known as the "bus" (sometimes also referred to as "spacecraft bus"). The bus is usually a very large portion of the spacecraft and contains power, propulsion, communication, control functions, data acquisition, solar arrays and antennas necessary to perform the various tasks that the spacecraft will be required to perform once placed in orbit. However, many smaller emerging spacecraft require hours or days of operation, and not years, as with typical spacecraft of past years. New emerging spacecraft also require less battery power and often times do not require solar arrays. Such small and emerging spacecraft may involve antennas, re-entry structures, propulsion devices, imaging devices, weather devices or sensors, radiation and environmental devices or sensors, and communication devices or sensors. Furthermore, many such emerging spacecraft that form non-primary payloads that one desires to place in orbit simply require space access and not specific orbits or inclinations, thus resulting in no need for an onboard propulsion subsystem for the non-primary payload.

Emerging spacecraft often do not need all of the capabilities of a traditional spacecraft bus that is otherwise required for a traditional spacecraft to achieve orbital status. Presently, spacecraft buses are developed with standard capabilities in particular size and weight categories, thus resulting in a "bus centric" approach, rather than a "user centric" approach. A user centric approach would provide an emerging spacecraft with only the resources that it requires for its mission; for example, only battery power, or communication capability, or various other control capabilities, rather than the full panoply of functions and capabilities provided by a traditional spacecraft bus. Such a cost effective approach would reduce the overall cost of each emerging spacecraft that is to be carried into space on a launch vehicle because the spacecraft would only be provided with limited resources suited to its particular mission. Such an approach would also enhance overall system integrity because the emerging spacecraft would not be required to access the traditional spacecraft bus or the primary payload(s) on the launch vehicle to meet its operational requirements. This would reduce the points of potential failure for the traditional spacecraft bus and be completely non-invasive to the traditional spacecraft bus. Physical separation of the emerging spacecraft from the traditional spacecraft bus would further increase the reliability and competence of launch vehicle operation, the primary payload mission and all secondary payload missions.

SUMMARY OF THE INVENTION

The present invention is directed to a system and method for forming a spacecraft adapter having embedded (i.e., dedicated) resources. The spacecraft adapter is secured to a launch vehicle and includes its own operational subsystems; for example, power, communications capability, interface modules, etc., apart from the standard spacecraft bus of the primary payload being carried by the launch vehicle.

In one preferred form the spacecraft adapter includes a battery, power distribution and control subsystem, and an interface circuit for interfacing with an emerging spacecraft or non-primary payload being supported by the spacecraft adapter. In alternative embodiments the spacecraft adapter can include its own data storage module, independent sensor and data interfaces, independent communications subsystem, etc., or a range of other subsystems that may be desirable/necessary for completing a specific mission with the emerging spacecraft. The spacecraft adapter forms essentially an independent component having dedicated resources, and that does not require interfacing with the traditional spacecraft bus of the primary payload being carried by the launch vehicle. The spacecraft adapter can be constructed to include those modules/subsystems needed to provide only that degree of functionality required for a specific emerging spacecraft. This significantly reduces the overall cost associated with placing the emerging spacecraft in space. Importantly, there is no need to couple the spacecraft adaptor with any portion of the standard spacecraft bus of the primary payload. The spacecraft adapter can thus be constructed in various configurations to provide only that degree of functionality needed for a given emerging spacecraft and the specific mission which is being undertaken, and without potentially reducing the reliability of the standard spacecraft bus.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
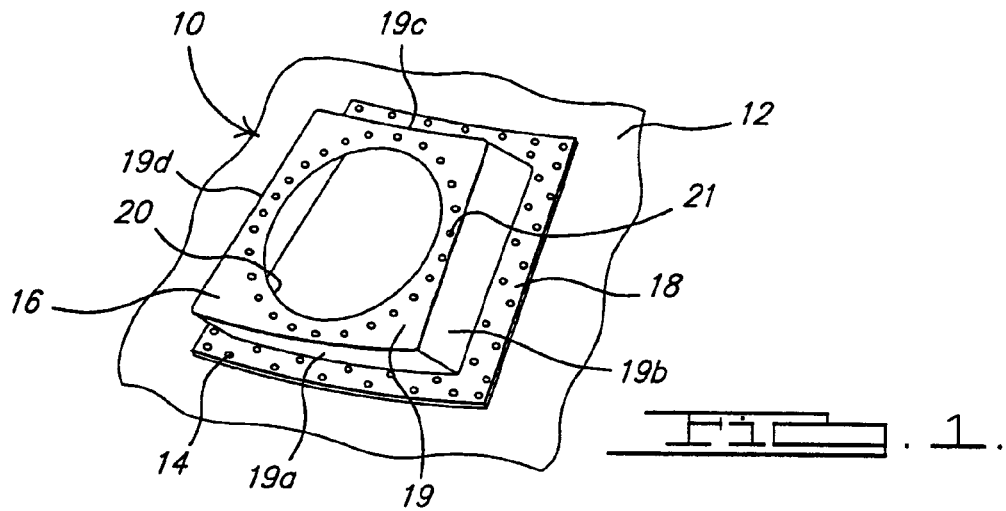
FIG. 1 is a simplified perspective view of a portion of a launch vehicle with a spacecraft adapter in accordance with the preferred embodiment of the present invention secured to the launch vehicle.

Referring to FIG. 1, there is shown an exemplary embodiment of a spacecraft adapter 10. The spacecraft adapter 10 is fixedly secured to a portion of a launch vehicle 12. The adapter 10 may be secured to a variety of areas on the launch vehicle, such as on a fairing. The precise placement of the spacecraft adapter 10 on the launch vehicle may depend on various factors such as functional constraints, available launch platform volume or surface area, structural attachment considerations and/or mass and coupled loads considerations.

The spacecraft adapter 10 includes a flange 18 having a plurality of holes 14. The flange 18 extends from a housing 16. The shape, size, configuration and attachment of the housing 16 can be varied as needed to suit a specific launch vehicle and/or a particular non-primary payload. The holes 14 accept fasteners to hold the housing 16 to the launch vehicle 12.

The housing 16 includes a support panel 19 having a plurality of walls 19a-19d. The support panel 19 and walls 19a-19d define an enclosure for enclosing modular components that will interface with the non-primary payload. An opening 20 allows external attachment of the non-primary payload to the adapter. For convenience, the term "non-primary payload" will be used throughout the following discussion to represent any payload or emerging spacecraft that is carried by the launch vehicle 12 other than the primary payload carried by the vehicle 12. The non-primary payload can itself be secured in any suitable manner to the launch vehicle or to the housing 16. A wide variety of other shapes of the housing 16 could be implemented and the housing 16 illustrated is merely one example.

Figure 2:
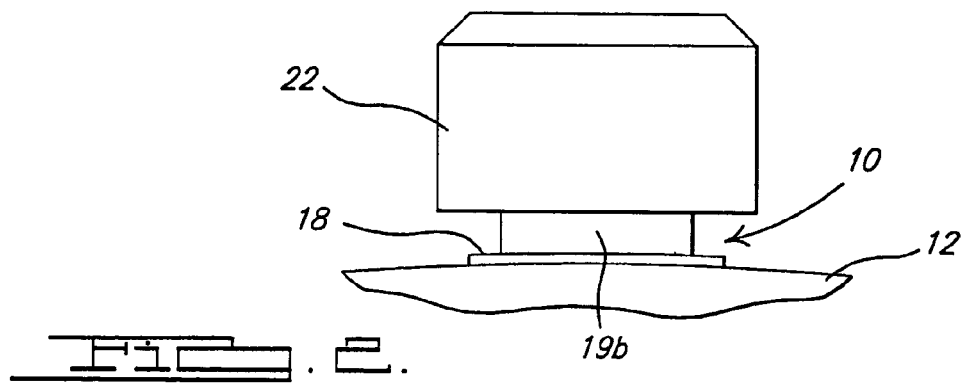
FIG. 2 is a side view of an exemplary non-primary payload attached to the spacecraft adaptor.

Referring to FIGS. 1 and 2, an exemplary non-primary payload 22 is illustrated secured to the housing 16. In FIG. 1, the support panel 19 has a plurality of holes 21 to permit attachment of the non-primary payload 22 by conventional fastening elements such as threaded fasteners, rivets, etc.

Figure 3:
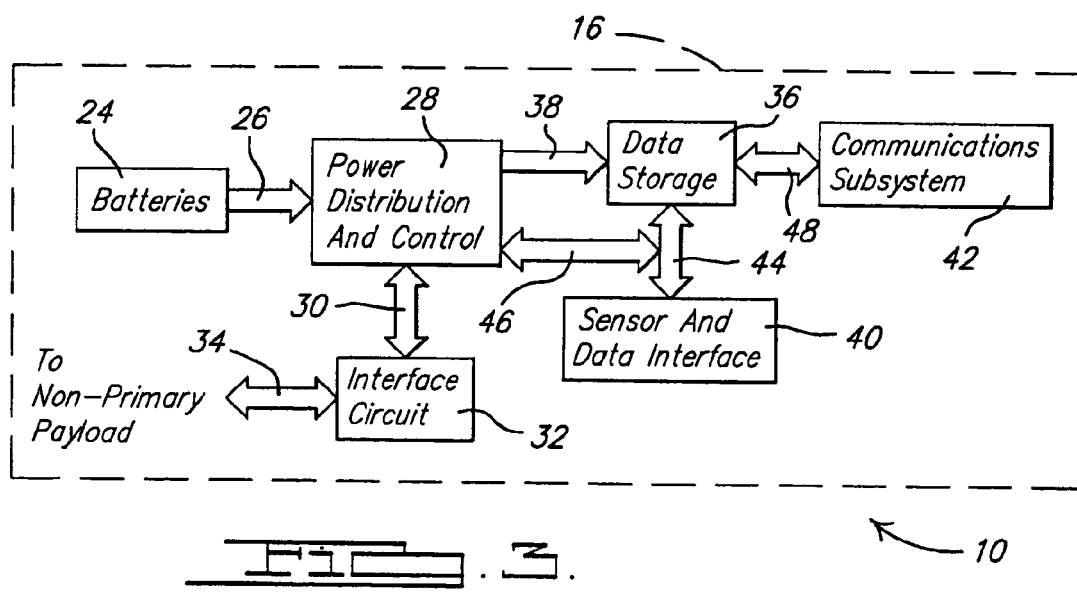
FIG. 3 is a simplified block diagram of the functions that might be contained within modular components that are mounted within the spacecraft adapter, with the housing of the adapter shown in simplified form by a dashed line.

Referring to FIG. 3, a simplified diagram is shown of the various subsystem functions (i.e., embedded resources) included within the spacecraft adapter 10. The housing 16 is shown in a highly simplified form by dashed line 16. The adapter 10 includes a power source such as a fuel cell, battery, battery pack or other energy storage device. For convenience, reference will be made to a battery pack 24, Battery pack 24 is in communication via a bus 26 with a power distribution and control subsystem 28. The power distribution and control subsystem 28 is in communication via bus 30 with an interface circuit 32. Interface circuit 32 is coupled via suitable cabling 34 with an electrical interface to the non-primary payload 22. In various preferred forms, the adapter 10 may include a data storage module 36 in communication with the power distribution and control subsystem 28 via a bus 38. A sensor and data interface 40 and/or a communications subsystem 42 may also be implemented. Sensor and data interface 40 may be interfaced via busses 44 and 46 with the data storage module 36 and the power distribution and control subsystem 28, respectively. If communication subsystem 42 is employed, it may be interfaced with the data storage module 36 via bus 48. It will be appreciated that other subsystems may be included as part of the adapter 10 depending upon the needs of the non-primary payload 22 and/or the specific mission that the non-primary payload needs to accomplish. As a result, one or more of the subsystems/modules shown as making up the adapter 10 could be omitted. However, it is anticipated that at least the battery or battery pack 24, a power distribution and control system 28 and interface circuit 32 may, in most applications, be the minimum configuration elements needed to serve the non-primary payload 22.

The communication subsystem 42 may comprise a RF transceiver or any other form of communications device for providing communications capability between the non-primary payload 22 and a terrestrial or extraterrestrial transceiver. Data storage module 36 could comprise random access memory (RAM) or any other suitable form of data storage for storing information used by, or gathered by, the non-primary payload 22. Sensor and data interface 40 may be used to interface, via a suitable electrical cable (non-shown) with the non-primary payload 22 to thus communicate with one or more on-board sensors carried by the non-primary payload. Power distribution and control subsystem 28 may be used to provide regulated electrical power to power the various modules and subsystems of the adapter 10, as well as various electrical components or subsystems carried by the non-primary payload 22. Interface circuit 32 may comprise any form of suitable circuit, such as RS422, RS232, IEEE 1394 or USB, which adheres to the standards and protocols required by the non-primary payload 22.

Figure 4:
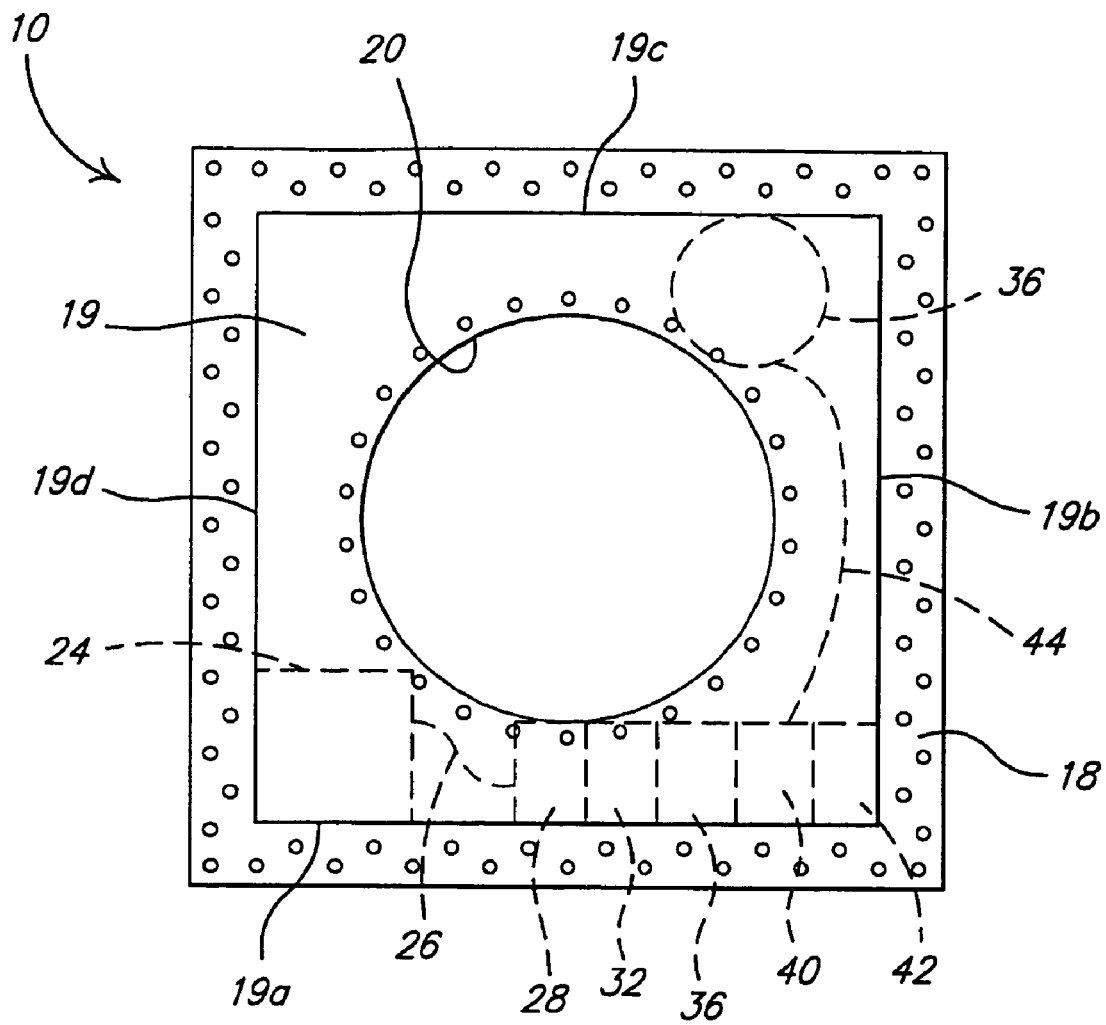
FIG. 4 is a plan view of the spacecraft adaptor illustrating an exemplary placement of the modular components within the housing.

FIG. 4 illustrates a simplified plan view of the housing 16 illustrating an exemplary placement of the components 24, 28, 32, 36, 40 and 42 within the housing. The opening 20 permits one or more communications devices, such as one or more wiring harnesses (not shown), to exit the housing 16 and be interfaced with the non-primary payload.

It is an advantage of the adapter 10 that the adapter does not need to be interfaced with a spacecraft bus of a primary payload being carried by the launch vehicle 12. Thus, the adapter 10 can be provided in various configurations to provide only that degree of functionality required of a particular non-primary payload. This significantly reduces the cost associated with each non-primary payload carried by the launch vehicle 12 and provides significant additional flexibility to the spacecraft designer. By not requiring any interfacing with the spacecraft bus of the primary payload, the points of failure of the spacecraft bus are reduced. This enhances the overall reliability of the spacecraft bus. Also, the integrity of the primary payload is unaffected by the presence and operation of the non-primary payload. The integrity of the launch vehicle itself is further unaffected by the presence and operation of the non-primary payload 22.

Another advantage of the spacecraft adapter 10 is that it provides an economical means for a wide variety of non-primary payloads to be operationally supported by the launch vehicle 12. Furthermore, the non-primary payload 22 illustrated in FIG. 2 could be supported in such a manner that it is intended to be deployed once reaching a desired point in space, or it may be configured such that it stays with a portion of the launch vehicle 12 to which it is attached. The modular configuration of the components within the adapter 10 allows ready modification and implementation of other subsystem functions as needed to meet specific operational requirements of specific types of non-primary payloads. The adaptor 10 also provides the designer with the flexibility to configure multiple non-primary payloads to use one or more common resources provided by the adaptor 10.

The adapter 10 could also be configured utilizing any combination of space-rated and/or commercial, off-the-shelf components. The independent modules and subsystems of the adapter 10 are also preferably sized so that maximum usage across multiple launch platforms can be achieved. By this it is meant that the dimensions of the various modules and sub-modules are such that various launch platform diameters, layouts and attachment methods can be supported with minimal or no tailoring to either the adapter 10 or the launch platform.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A modular, embedded resources adaptor for use on a launch platform, independent of a spacecraft bus carried by the launch platform, comprising;

a housing fixedly secured to the launch platform, the housing be configured to enable physical coupling to a non-primary payload, so as to support the non-primary payload therefrom;

a power source housed within the housing;

a power distribution and control subsystem in communication with said power sources, and being housed within the housing; and at least one interface module contained within said housing for interfacing with the non-primary payload supported on the launch vehicle; and wherein said power source, said power distribution and control sub-system and said interface module operate completely independently from said spacecraft bus.

2. The adaptor of claim 1, further comprising at least one of the group including:

a data storage subsystem;

a communication subsystem; and a data interface.

3. The adaptor of claim 1, further comprising a sensor interface for interfacing directly with a sensor carried by said non-primary payload.

4. The adaptor of claim 1, wherein said power source comprises at least one of a fuel cell, battery or battery pack.

5. A modular, embedded resources adaptor for use on a space craft launch platform, independent of a spacecraft bus carried by the launch platform, comprising:

a housing fixedly secured to said launch platform;

a power source disposed within said housing;

a power distribution and control subsystem disposed within said housing and in communication with said power source;

a data storage module disposed within said housing; and an interface module in communication with said power distribution and control and housed within said for interfacing with a non-primary payload being carried by said launch vehicle; and wherein said power source, said power distribution and control sub-system and said interface module operate completely independently from said spacecraft bus.

6. The adaptor of claim 5, further comprising a communication subsystem disposed within said housing and interfaced with said data storage module.

7. The adaptor of claim 5, further comprising a sensor and data interface housed within said housing and interfaced with said power distribution and control subsystem.

8. The adaptor of claim 7, wherein the sensor and data interface is interfaced with the data storage subsystem.

9. The adaptor of claim 5, further comprising a communications device for coupling said interface module with said non-primary payload.

10. The adaptor of claim 5, wherein said housing includes a plurality of holes for enabling a non-primary payload to be fixedly secured by a plurality of fastening elements to an outer surface of the housing.

11. A modular spacecraft adaptor for use on a spacecraft launch vehicle independent of a spacecraft bus of the launch vehicle, the adaptor comprising:

a housing adapted to be fixedly secured to the launch vehicle;

a power source disposed in said housing;

a power and control distribution subsystem housed within said housing and in communication with said power source;

an interface module disposed adjacent said housing for interfacing with said power distribution and control subsystem, and also with a non-primary payload;

a communications module housed adjacent said housing; and wherein said power source, said power distribution and control sub-system and said interface module operate completely independently from said spacecraft bus.

12. The adaptor of claim 11, further comprising a data storage module disposed adjacent said housing.

13. The adaptor of claim 11, further comprising a sensor and data interface supported adjacent said housing for interfacing with an external sensor carried by said launch vehicle.

14. The adaptor of claim 11, further comprising a communications device for electrically coupling said interface module with said non-primary payload.

15. The adaptor of claim 11, wherein said housing includes a support panel having an opening to allow interfacing of said non-primary payload with components housed within said adaptor.

16. The adaptor of claim 11, further comprising a plurality of holes formed in said support panel for enabling attachment of said non-primary payload to said support panel.

* * * * *